United States Patent [19]

Sato

[11] Patent Number: 4,799,334
[45] Date of Patent: Jan. 24, 1989

[54] STABILIZER FOR AUTOMOBILE DOOR WINDOW GLASS

[75] Inventor: Youji Sato, Yokohama, Japan

[73] Assignee: Nifco, Inc., Yokohama, Japan

[21] Appl. No.: 130,925

[22] Filed: Dec. 10, 1987

[30] Foreign Application Priority Data

Dec. 13, 1986 [JP] Japan .................. 61-192007[U]

[51] Int. Cl.$^4$ ................................. E06B 7/16
[52] U.S. Cl. .................................. 49/493; 49/377
[58] Field of Search ............ 49/493, 377, 502, 415, 49/416

[56] References Cited

U.S. PATENT DOCUMENTS 2,500,297 3/1950 Schunk .................................. 49/493
3,763,596 10/1973 Anderson ........................ 49/493 X
4,424,647 1/1984 Sasaki et al. ...................... 49/377 X
4,442,634 4/1984 Kimura ................................ 49/493

Primary Examiner—Philip C. Kannan
Attorney, Agent, or Firm—Schwartz & Weinrieb

[57] ABSTRACT

A stabilizer for an automobile door window glass includes a plate-like bracket having opposite end mounting portions, a spacer having a predetermined thickness and fitted on the bracket, a stopper having through pin holes, a stabilizer body having a recessed portion in which the stopper is fitted and also having a mounting surface on which the bracket is fitted, and a cloth member with fur having opposite end portions formed with holes. The stabilizer body also has pins projecting from the bottom of the recessed portion, inserted through the holes of the cloth member and received in the pin holes of the stopper.

1 Claim, 10 Drawing Sheets

1

STABILIZER FOR AUTOMOBILE DOOR WINDOW GLASS

BACKGROUND OF THE INVENTION

1. Field of the Invention

This invention relates to a stabilizer for supporting an automobile door window glass and, more particularly, to a stabilizer which permits rigid mounting and ready assembly of cloth with fur constituting the stabilizer with mechanical locking of the stopper plate.

2. Prior Art Statement

A well-known stabilizer for an automobile door window glass will now be described with reference to FIGS. 1 to 9. As the stabilizer of this type, there are two different kinds, an outer stabilizer as shown in FIGS. 1 to 4 and an inner stabilizer as shown in FIGS. 5 to 9. These two different kinds of stabilizers are used as a pair to clamp a window glass between them. As is shown, each of these stabilizers consists of a bracket 101 consisting of a U-shaped portion and tongue-like portions extending from the opposite ends of the U-shaped portion, a spacer 102 consisting of an elastic material, e.g., rubber, and a cloth member 103 with fur. Each tongue-like portion extending from each end of the bracket 101 is formed with a mounting hole 101a, and the main flat portion of the U-shaped portion is formed with positioning holes 101b for positioning the spacer 102. The spacer 102 has projections 102a which are to be received in the positioning holes 101b. Further, the spacer 102 has edge walls 102b projecting from the opposite edges for engaging with the opposite edges of the bracket. The cloth member 103 with fur has a fur portion 103a covering at least the surface of the spacer 102. Opposite end portions of the spacer 102 have holes 103b which are to be penetrated by the projections 102a.

The spacer 102 is fitted on the flat portion of the bracket 101 with its projections 102a received in the holes 101b of the bracket 101 and its edge walls 102b engaged with the edges of the bracket 101. The cloth 103 with fur is fitted on the spacer 102 and bracket 101 by fitting the holes 103b in its end portion on the projections 102a of the spacer 102 projecting from the holes 101b of the bracket 101 and then fitting the holes 103b in its other end portion on the projections 102a.

In the well-known stabilizer as shown above, the cloth member 103 with fur is usually incorporated by sewing or bonding to integrate the bracket 101 and spacer 102 and also ensure reliable mounting of the cloth member 103 with fur.

However, where the bracket 101, spacer 102, etc. constituting the stabilizer are not suitable for sewing, the components are assembled solely by bonding.

Further, the illustrated stabilizer is an embodiment constituted by the method of bonding, and the bracket 101 which is produced from a metal plate, spacer 102 manufactured by the casting of rubber and cloth member with fur which consists of a Teflon-based material, all tend to be difficult to bond. The assembling of these components, therefore, requires a primer treatment of the surfaces to be bonded prior to the regular bonding. Particularly, the fur portion of the cloth member with fur loses the effect of fur with the attachment of the adhesive, so that it is necessary to apply the adhesive carefully using a brush.

Further, the spacer 102 mainly consists of a rubber material, and it is necessary to use a rubber-based sealant, which is hardened so as not to impede the elasticity of the rubber material and has a bonding surface having elasticity like that of rubber. Further, much time is necessary for the hardening.

Further, in such the assembly of the stabilizer by bonding, there is a high possibility that the quality of the assembled product will vary depending on the state of attachment of the adhesive and the skill of the operator.

Further, in the case of the outer stabilizer, it is necessary to mount a separate spacer 104 and the like on the bracket 101 for the sake of mounting of a component. This means that it is necessary to mold the spacer 104 and machine portions of the bracket for mounting the spacer 104, leading to an increase in the cost of the stabilizer.

OBJECT AND SUMMARY OF THE INVENTION

An object of the invention is to provide a stabilizer for an automobile door window glass which does not use any adhesive for the assembly, can be very readily assembled and has uniform quality.

To attain the above object of the invention, there is provided a stabilizer, which comprises a plate-like bracket with opposite end mounting portions, a spacer having a predetermined thickness and fitted on said bracket, a stopper having through pin holes, a stabilizer body having a recessed portion in which the stopper is fitted, and a mounting surface on which the bracket is fitted, the stabilizer body having pins projecting from the bottom of the recessed portion and inserted through the pin holes of the stopper, and a cloth member with fur having opposite end portions formed with holes for receiving the pins.

The bracket is in the form of an elongate plate with mounting holes provided opposite end portions, and the spacer is fitted on the surface of the plate-like portion of the bracket. The spacer mainly consists of an elastic material, e.g., rubber. The stopper is in the form of an elongate plate with through pin holes. The cloth member with fur has a fur portion on one side of its substantially central portion. It has opposite end overlap portions each formed with engagement holes. The stabilizer body has a recessed portion in which the stopper is fitted, and a mounting surface on which the bracket is fitted. Pins project from the bottom of the recessed portion. The pins are comparatively closely fitted in the engagement holes of the cloth member with fur and in the pin holes of the stopper.

In assembly, the spacer is overlapped over a plate-like portion of the bracket fitted on the mounting surface of the stabilizer body. Then, one of the overlap portions of the cloth member with fur is inserted into the recessed portion of the stabilizer body, and the cloth member with fur is wound on the stabilizer body such that it covers at least the bracket and spacer with the engagement holes of the overlap portions fitted on the pins projecting from the recessed portion. The other overlap portion of the cloth member with fur is then led again into the recessed portion, and the pins are inserted into the engagement holes of the overlap portion.

In such a state, the stopper is fitted in the recessed portion of the stabilizer body, and the pins are inserted into the pin holes of the stopper, whereby the overlap portions of the cloth member is reliably prevented from being detached.

The stabilizer having the above construction according to the invention, has the following features:

(i) The assembly of the stabilizer is completed merely by the winding and attachment of the cloth member with fur and fitting of the stopper on the stabilizer body. Therefore, it is possible to provide a stabilizer which can be readily assembled without need of any skill and has uniform quality.

(ii) In the method of assembly of the stabilizer components other than the bonding with adhesive, various inconveniences accompanied with the use of an adhesive, e.g., preliminary coating of primer on the bonding surface or a coating of a sealant, are avoided. Thus, it is possible to eliminate the work of coating of an adhesive or sealant and also operations necessary for the drying and solidification and provide a stabilizer quickly and easily.

(iii) Further, since the use of adhesive or primer is unnecessary, it is possible to eliminate the possibility of clumping of the fur portion of the cloth member and of escape of the adhesive or the like from the overlap portions of the cloth member with fur. Thus, the stabilizer can be assembled without need of any particular skill, and it is possible to effectively eliminate the generation of defective products.

(iv) Further, the cloth member with fur is inserted in the recessed portion of the stabilizer body with room to spare and is stretched and firmly supported by the stopper. Thus, the cloth member with fur can be readily wound, and the wound and fitted cloth member with fur is sufficiently stretched.

(v) Further, the wound and fitted cloth member with fur is held in a mechanically locked state by the reliable engagement of the pins and close planar fitting of the stopper in the recessed portion of the stabilizer body, and it is possible to effectively prevent deviation over long use and deviation due to repeated application of frictional contact pressure.

The above and other objects and features of the invention will become more apparent from the following detailed description with reference to the accompanying drawings.

DETAILED DESCRIPTION OF THE PREFERRED EMBODIMENTS

Figure 1:
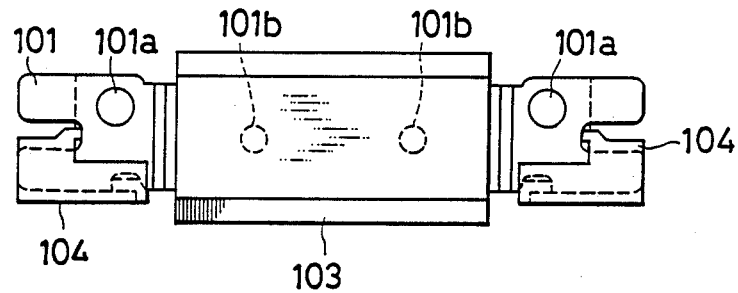
FIG. 1 is a plan view showing a well-known outer stabilizer.
Figure 2:
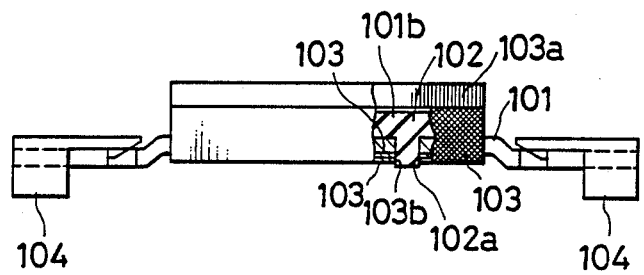
FIG. 2 is a front view, partly broken away, showing the stabilizer shown in FIG. 1.
Figure 4:
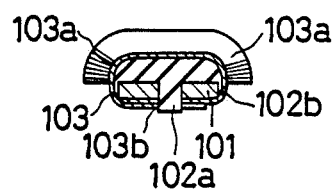
FIG. 4 is a sectional view showing the stabilizer of FIG. 1.
Figure 3:
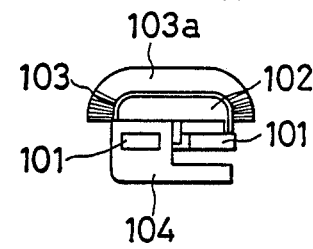
FIG. 3 is a side view showing the stabilizer of FIG. 1.
Figure 5:
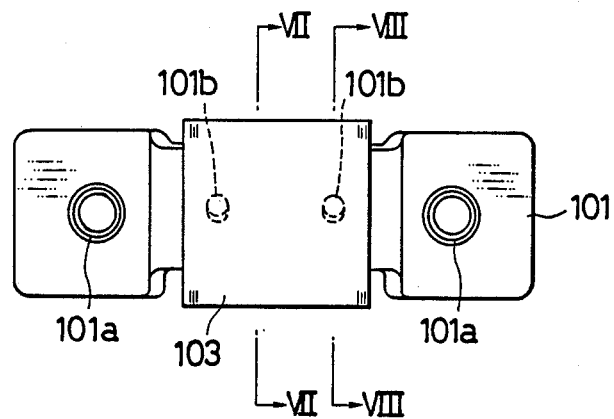
FIG. 5 is a plan view showing a well-known inner stabilizer.
Figure 6:
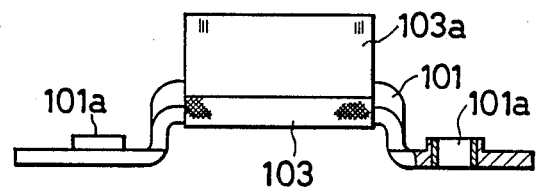
FIG. 6 is a front view, partly broken away, showing the stabilizer of FIG. 5.
Figure 7:
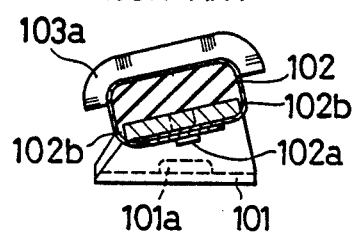
FIG. 7 is a sectional view taken along line VII—VII in FIG. 5.
Figure 8:
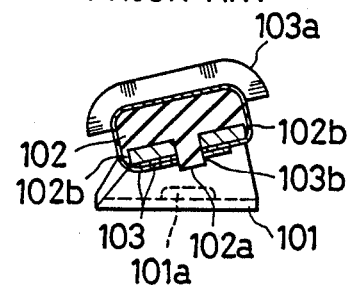
FIG. 8 is a sectional view taken along line VII—VII in FIG. 5.
Figure 9:
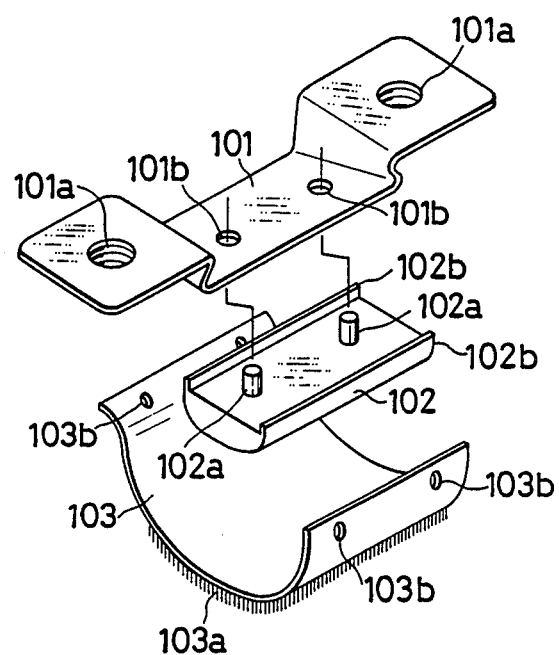
FIG. 9 is an exploded perspective view showing the stabilizer of FIG. 5.
Figure 10:
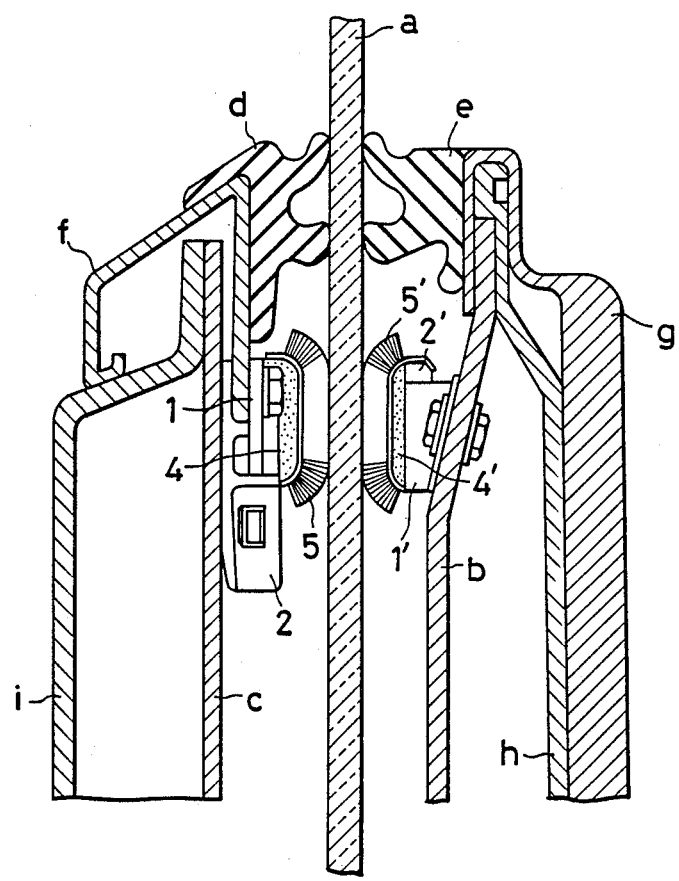
FIG. 10 is a sectional view showing the stabilizer according to the invention in use.

FIG. 10 shows an embodiment of the invention. As is shown, there are an outer stabilizer and an inner stabilizer, these stabilizers being in contact with the respective outer and inner side surfaces of an automobile door window glass a. These two different stabilizers are mounted as a pair on respective reinforcement members b and c to clamp the door window glass a from the inner and outer sides thereof. To facilitate understanding, inner and outer seal strips d and e are shown in frictional contact with door window glass a, the outer and inner seal strips d and e being respectively mounted on top of respective components f and g. Designated at h and i are respectively inner and outer panels of the door.

FIGS. 11 to 16 illustrate an embodiment of the outer stabilizer according to the invention. As is shown, the stabilizer comprises a bracket 1, a stabilizer body 2, a stopper 3, a spacer 4 and a cloth member 5 with fur.

The bracket 1 consists of an elongate metal plate having a channel-shaped central portion 12 and tongue-like portions 12' extending from the opposite ends of the channel-shaped portion. The tongue-like portions 12' are each formed with a mounting hole 11, and the channel-shaped portion 12 is formed with a plurality of engagement holes 20 and a single different engagement hole 21.

Figure 11:
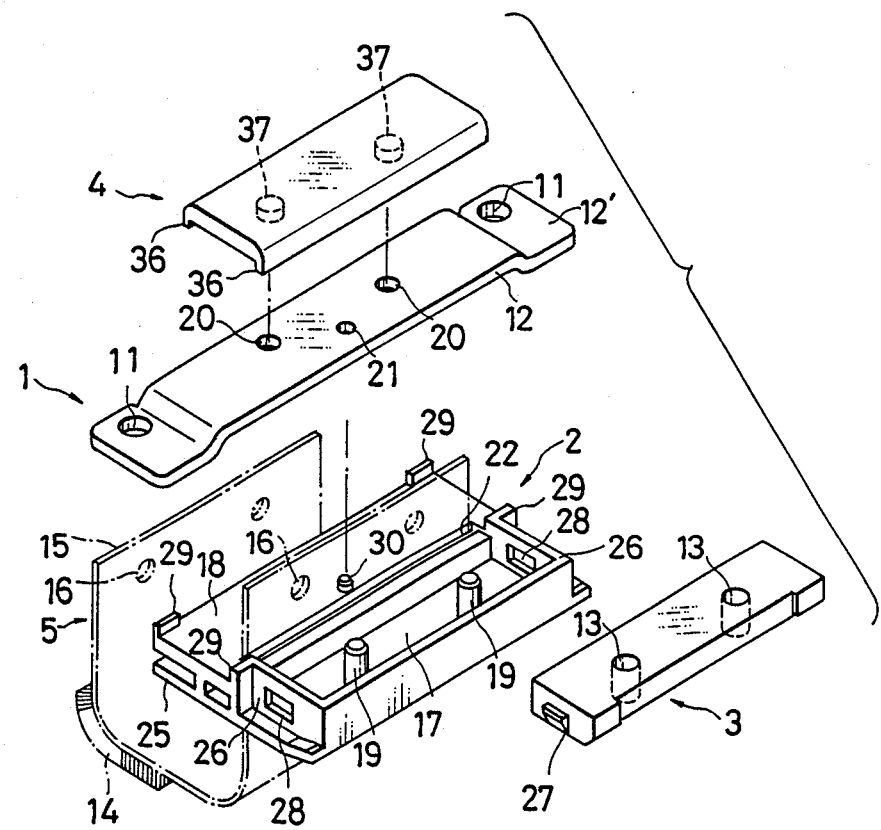
FIG. 11 is an exploded perspective view showing an embodiment of the outer stabilizer according to the invention.
Figure 12:
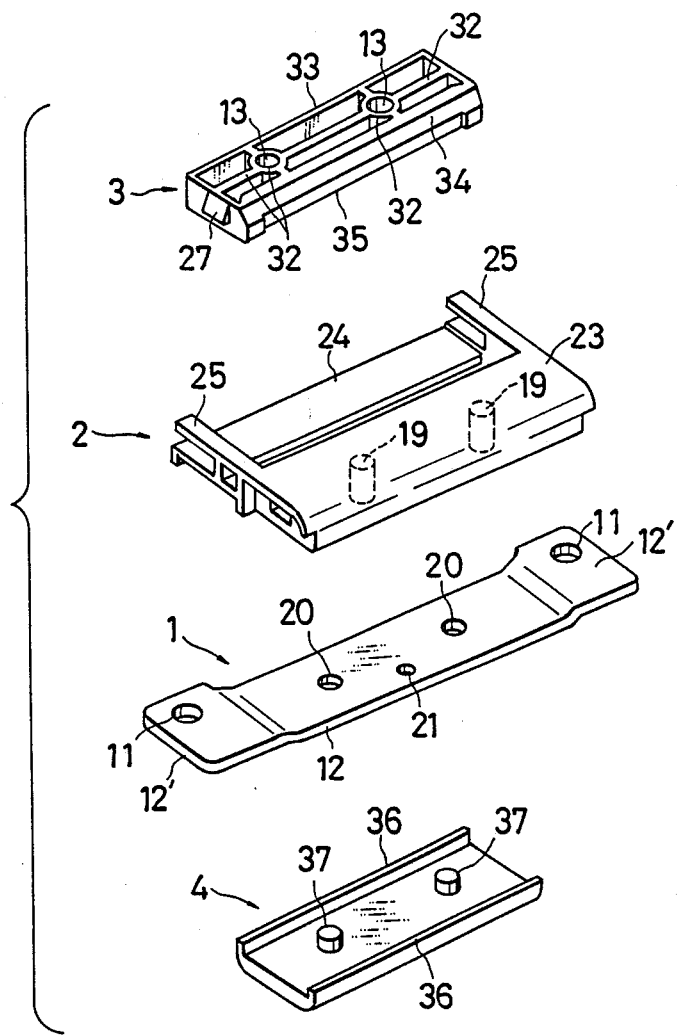
FIG. 12 is an exploded perspective view showing the stabilizer of FIG. 11 upside down.
Figure 15:
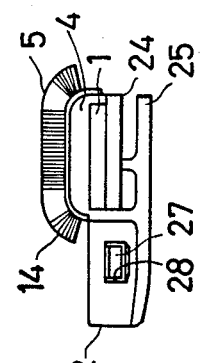
FIG. 15 is a side view of the stabilizer of FIG. 11.
Figure 16:
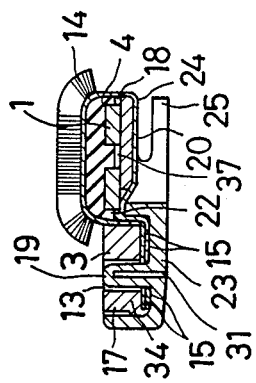
FIG. 16 is a sectional view showing the stabilizer of FIG. 11.
Figure 13:
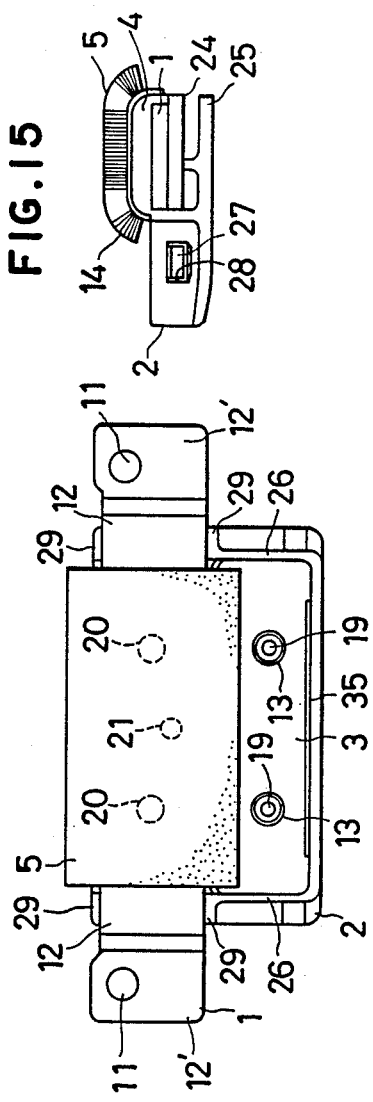
FIG. 13 is a plan view showing the stabilizer of FIG. 11.
Figure 14:
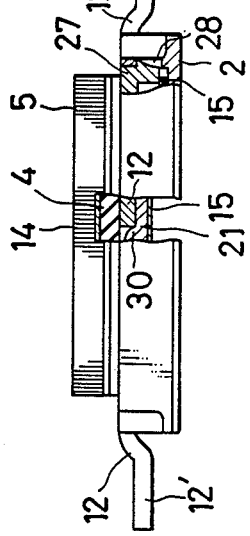
FIG. 14 is a front view, partly broken away, showing the stabilizer of FIG.11.
Figure 17:
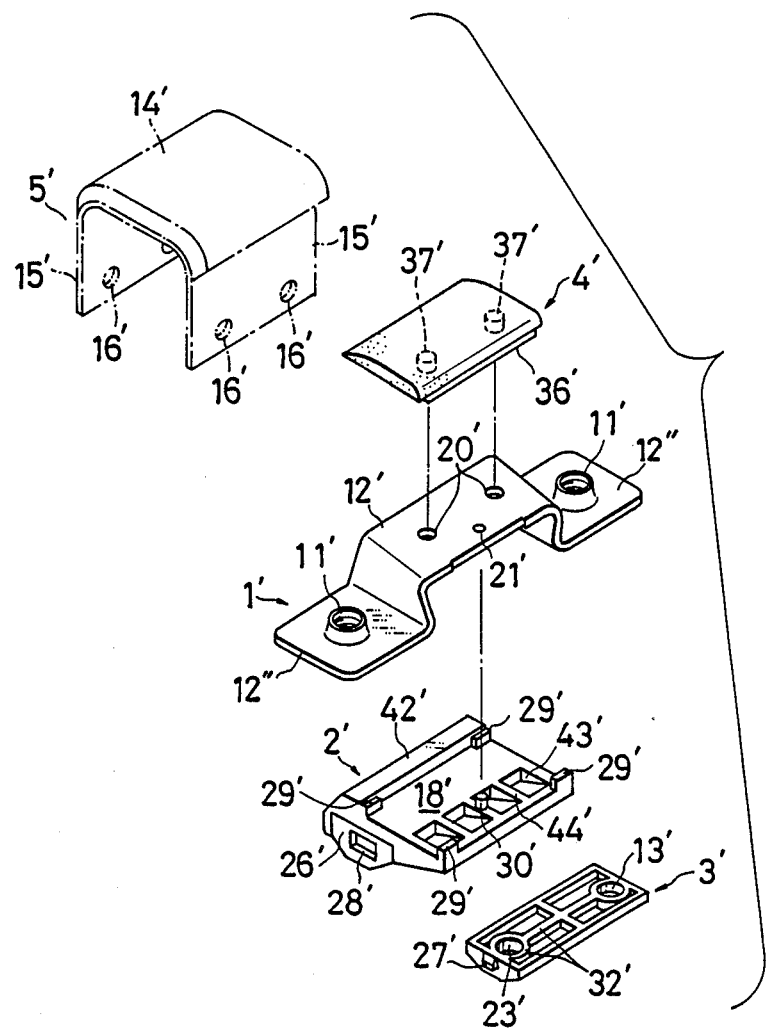
FIG. 17 is an exploded perspective view showing an embodiment of the inner stabilizer according to the invention.
Figure 18:
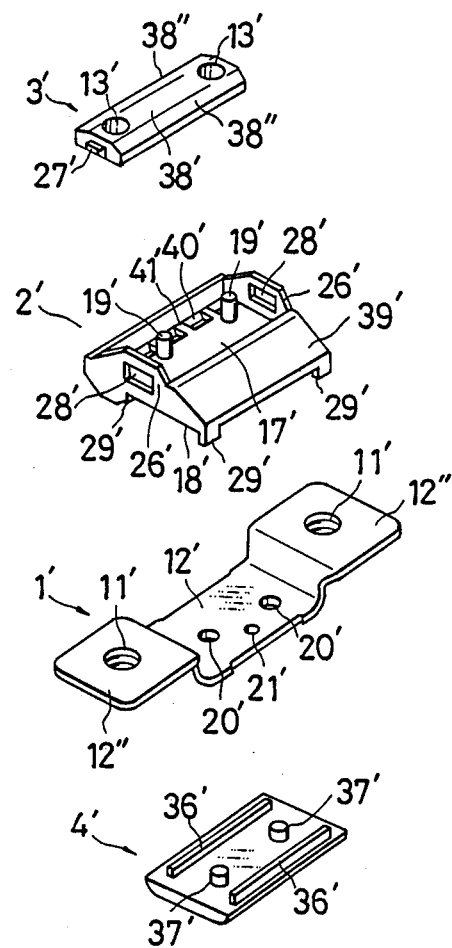
FIG. 18 is an exploded perspective view showing the stabilizer of FIG. 17 upside down.
Figure 21:
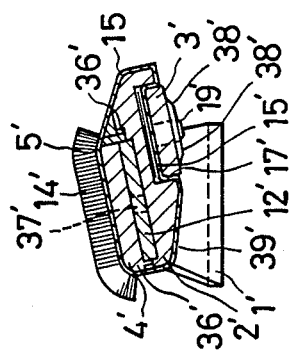
FIG. 21 is a sectional view taken along line XXI-XXI in FIG. 19.
Figure 22:
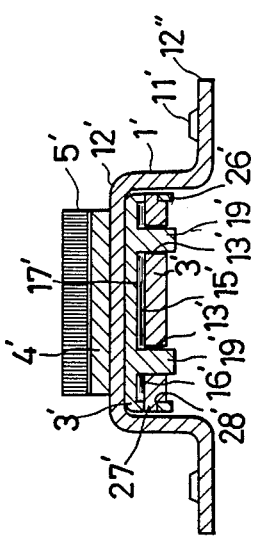
FIG. 22 is a sectional view taken along line XXII—XXII in FIG. 19.
Figure 19:
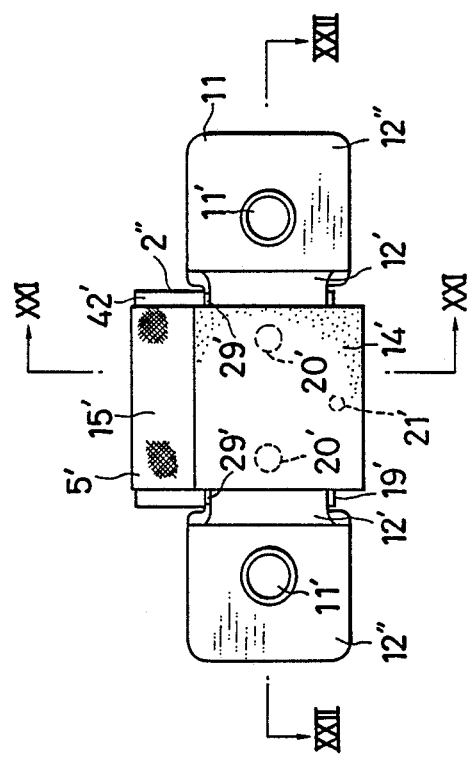
FIG. 19 is a plan view showing the stabilizer of FIG. 17.
Figure 20:
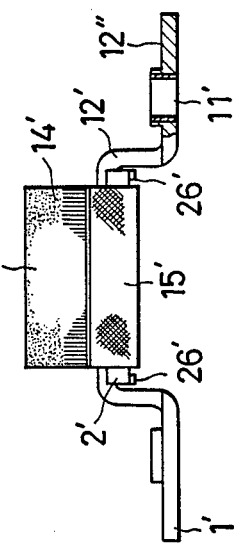
FIG. 20 is a front view, partly broken away, showing the stabilizer of FIG. 17.

The stabilizer body 2 is in the form of a flat box. It has a recessed portion 17 and a flat mounting surface 18, these portions being integral and extending side by side in the longitudinal direction, with a slit 22 formed therebetween for passing one end of the cloth member 5 therethrough as shown in FIG. 11. The stopper 3 is adapted to be accommodated in the recessed portion 17. The bracket 1 is adapted to be fitted on the mounting surface 18. The flat mounting surface 18 is positioned such that the surface of the bracket 1 is flush with the open edges of the recessed portion 17 when the bracket 1 is mounted on the mounting surface 18.

The other side of the stabilizer body 2 has a flat smooth surface 23 consitituting the back of the recessed portion 17 and a recessed portion 24 constituting the back of the mounting surface 18. At the opposite ends of the recessed portion 24 in the longitudinal direction thereof, tongue-like portions 25 extend perpendicularly from the flat smooth surface 23. An end of the component f is inserted between the tongue-like portions 25 and the surface of the recessed portion 24.

The recessed portion 17 has upright end walls 26 located slightly on the inner side of the ends of the stabilizer body 2. These end walls 26 are each formed with an engagement window 28 in which an engagement pawl 27 of the stopper 3 is engaged. A pair of pins 19 project upright from the bottom of the recessed portion 17 such that their upper ends are flush with the open edges of the recessed portion 17. Each pin 19 has a frustoconical upper end.

The mounting surface 18 of the stabilizer body 2 has engagement ridges 29 extending upright along the outer edge and adjacent the opposite ends such that the bracket 1 is mounted. Also, it has an engagement projection 30 located at a position nearer the slit 22 and adapted to be engaged in the hole 21 of the bracket 1.

The pins 19 is the recessed portion 17 are formed with respective small bores 31 extending from the smooth surface 23 toward the free end of the pins 19 in order to prevent deformation thereof.

The stopper 3 has a shape and a size such that it is closely fitted in the recessed portion 17 of the stabilizer body 2. It has engagement pawls 27 each provided on each longitudinal end, and is also formed with pin holes 13 penetrating it for receiving the pins 19. The stopper 3 is in the form of a flat box consisting of ribs 32 inclusive of portions defining the pin holes 13 and upright walls 33 for the purpose of preventing deformation of the stopper itself and for saving material. Further, the upper edges of the upright walls 33 are outwardly chamfered to form chamfered surfaces 34 so as to facilitate smooth fitting of the stopper 3 in the recessed portion 17. Further, the outer surface of each upright wall 33 continuous with the chamfered surface 34 is formed with a stepped portion or recess 35 to permit escape of the end of the cloth member 5 with fur.

The spacer 4 consists of an elastic material, e.g., synthetic rubber. It has a shape such that it fits in the channel-shaped portion 12 of the bracket 1, and it has opposite upright edge walls 36. Its portion between the opposite edge walls 36 has engagement projections 37 to be engaged in the holes 20 of the bracket 1.

The cloth member 5 with fur is assembled with the bracket 1, stabilizer body 2, stopper 3 and spacer 4 having the above structures. The cloth member 5 with fur has a fur portion 14 provided on one side of a central portion of the base cloth. It has opposite overlap end portions 15 having respective engagement holes 16, which are fitted on the pins 19 provided in the recessed portion 17 of the stabilizer body 2.

In assembly, one of the overlap end portions 15 of the cloth member 5 with fur is led through the slit 22 into the recessed portion 17 of the stabilizer body 2. Then, ample room being provided, the engagement holes 16 are fitted on the pins 19. The bracket 1 is then fitted on the mounting surface 18 of the stabilizer body 2, with the projection 30 engaged in the hole 21 for positioning. Thereafter, the spacer 4 is fitted by positioning it with its projections 37 in the holes 20 of the bracket. Subsequently, the cloth member 5 with fur is wound on the components assembled so far. The other overlap end portion 15 of the cloth member 5 with fur is then led into the recessed portion 17, and the pins 19 are fitted in the engagement holes 16.

Thus, the overlap end portions 15 of the cloth member 5 with fur are overlapped with their engagement holes 16 fitted on the pins 19 of the recessed portion 17. In such a state, the stopper 3 is fitted in the recessed portion 17, the pin holes 13 of the stopper 3 and pins 19 are engaged with one another, and the engagement pawls 27 of the stopper 3 are hooked in the windows 28 of the stabilizer body 2. In this way, the overlap end portions 15 of the cloth member 5 with fur are urgedly locked by the stopper 3.

As has been shown, in the mounting of the cloth member 5 with fur, its overlap end portions 15 that have been loosely introduced into the recessed portion 17 are held strongly stretched by the stopper 3 in the recessed portion 17. Consequently, the fur portion 14 on the spacer 4 is closely stretched over the surface of the spacer 4.

Now, an embodiment of the inner stabilizer according to the invention will be described with reference to FIGS. 17 to 22.

The illustrated structure of the inner stabilizer is basically the same as the structure of the outer stabilizer described above. It comprises a bracket 1', a stabilizer body 2', a stopper 3', a spacer 4' and a cloth member 5' with fur. The bracket 1' is entirely the same as the bracket 1 in the outer stabilizer noted above except that the bracket 1' has an inclined channel-like portion 12'. The stopper 3' is the same as the stopper 3 except that it dispenses with the recess 35 and that chamfered surfaces 38" are formed along the opposite edges of a surface 38' which serves as the front side surface when it is fitted in the recessed portion 17'.

The spacer 4' has the same structure as the spacer 4 of the outer stabilizer except that it has a slightly inwardly positioned upright edge wall 36' and that one of the opposite edges of the spacer 4' projects slightly sidewise from the channel-shaped portion 12' of the bracket 1' when the channel-shaped portion 12' is fitted between the edge walls 36'. The cloth member 5' with fur has entirely the same structure as the cloth member 5 with fur.

The stabilizer body 2' which is used for the inner stabilizer is in the form of a flat box, one side of which becomes progressively thinner. It has a flat mounting surface 18', and it has a recessed portion 17' formed on the corresponding surface. The mounting surface 18' and recessed portion 17' are on the opposite sides of the stabilizer body 2', and its surface 39' continuous with the recessed portion 17' is a smooth taper surface which is inclined toward the edge. The recessed portion 17' has its bottom formed with a further recessed portion 40', which is reinforced by ribs 41'.

With the recessed portions 17' and 40' a ridge 42' is formed on the mounting surface 18' and the surface of the bracket 1' fitted between the ridge 42' and upright edge wall 29' is substantially flush with the surface of the ridge 42' and edge wall 29'.

A recessed portion 43' is provided in the mounting surface 18' extending along the edge of the stabilizer body 2' which has a small thickness, and the recessed portion 43' is reinforced with ribs 44'.

To assemble this inner stabilizer, the spacer 4' is fitted on the bracket 1' fitted on the mounting surface 18' of the stabilizer body 2'. Then, after inserting the projections 30' and 37' in the holes 21' and 20' to effect positioning, the holes 16' in one of the overlap end portions 15' of the cloth member 5' with fur are fitted on the pins 19', when the cloth member 5' with fur is wound on the assembled components, and then the holes 16' of the other overlap end portion 15' are fitted on the pins 19.

In the above state, the stopper 3' is fitted in the recessed portion 17 of the stabilizer body 2', whereby the overlap end portions of the cloth member 5' with fur are strongly pulled into the recessed portion 17' to be stretched over and in close contact with the spacer 4'.

As has been described in the foregoing, with the stabilizer according to the invention cumbersome assembling operations such as bonding with adhesive and preliminary treatment of the bonding surfaces are all unnecessary, and it is possible to merely wind the cloth member with fur and engage it by simply pushing the stopper, thus effectively simplifying the assembly process and greatly reducing the operation time.

Further, since the assembly is done without the unreliable adhesive but with mechanical engaging means of engagement on pins and urging with the stopper, loosening over long use is prevented.

Further, the cloth member with fur is sufficiently spread by merely inserting it in an overlapped state into the recessed portion and urging it with the stopper. Thus, it is possible to eliminate the loosening of the cloth member with fur on the spacer and generation of defective products due to defective tightening of the cloth member with fur.

What is claimed is:

1. A stabilizer for an automobile door window glass comprising a plate-like bracket having opposite end mounting portions, a spacer having a predetermined thickness and fitted on said bracket, a stopper having through pin holes, a stabilizer body having a recessed portion in which said stopper is fitted, and a mounting surface on which said bracket is fitted, said stabilizer body having pins projecting from the bottom of said recessed portion and inserted through said pin holes of said stopper, and a cloth member with fur having opposite end portions formed with holes for receiving said pins, said spacer being fitted on said bracket fitted on said stabilizer body, said cloth member with fur with the engagement holes in one of the end portions engaged on the pins projecting from the bottom of said recessed portion being wound on said stabilizer body by covering said spacer, the other end portion of said cloth member with fur being overlapped over said cloth member with fur on the bottom of said recessed portion with said engagement holes fitted on said pins, said stopper being fitted in said recessed portion with the pins projecting from the bottom of said recessed portion being engaged in said pin holes of said stopper, the overlapped end portions of said cloth member with fur being supported by said fitted stopper.

* * * * *